United States Patent [19]

Schon

[11] Patent Number: 5,047,226

[45] Date of Patent: Sep. 10, 1991

[54] PROCESS FOR THE REMOVAL OF ARSENIC IN THE MANUFACTURE OF HYDROFLUORIC ACID

[75] Inventor: Raul B. Schon, Colonia Granada, Mexico

[73] Assignee: Fluorex, S.A. DE C.V., Mexico

[21] Appl. No.: 449,446

[22] Filed: Dec. 12, 1989

Related U.S. Application Data

[63] Continuation of Ser. No. 282,649, Dec. 12, 1988, abandoned.

[51] Int. Cl.$^5$ .............................................. C01B 7/19
[52] U.S. Cl. ................................... 423/484; 423/483; 210/758
[58] Field of Search ............... 423/483, 484, 464, 489; 210/758, 759; 203/31

[56] References Cited

U.S. PATENT DOCUMENTS

| | | | |
|---|---|---|---|
| 3,166,379 | 1/1965 | Bradley et al. | 423/484 |
| 4,032,621 | 6/1977 | Meadows | 423/483 |
| 4,491,570 | 1/1985 | Wheaton et al. | 423/483 |

FOREIGN PATENT DOCUMENTS

| | | | |
|---|---|---|---|
| 266930 | 1/1964 | Australia | 423/484 |
| 5606 | 4/1964 | Japan | 423/484 |

Primary Examiner—Michael L. Lewis
Assistant Examiner—Brian M. Bolam
Attorney, Agent, or Firm—Roylance, Abrams, Berdo & Goodman

[57] ABSTRACT

There is disclosed a process wherein impurities are removed from hydrofluoric acid by converting the highly volatile arsenic compounds into a compound with a very high boiling point. The process comprises the following steps: input of distilled hydrofluoric acid, which contains arsenic, into a reactor and cooling down to a temperature below room temperature; oxidation of the arsenic contained in the hydrofluoric acid in the form of arsenic trifluoride with an oxidizing agent in the presence of a surplus of potassium ions coming from potassium bifluoride in order to obtain an arsenic complex which is both stable and of high boiling point; halting the cooling of the reaction mixture and continuation of the stirring for a period of from 1-24 hours, permitting the mixture to remain quiescent to permit deposition; and finally distilling of the hydrofluoric acid at a temperature below reflux conditions, whereupon the arsenic complex formed during the oxidation reaction is removed from the hydrofluoric acid.

4 Claims, 1 Drawing Sheet

PROCESS FOR THE REMOVAL OF ARSENIC IN THE MANUFACTURE OF HYDROFLUORIC ACID

This is a continuation of application Ser. No. 07/282,649 filed Dec. 12, 1988, now abandoned.

BACKGROUND OF THE INVENTION

This invention relates to a new process for the removal of arsenic impurities contained in distilled hydrofluoric acid, by means of oxidation with solid potassium permanganate ($KMnO_4$) (100%) which is used as an oxidant and solid potassium bifluoride ($KHF_2$) (100%) which is used as a donor of potassium ions to reduce the requisite amount of $KMnO_4$ required. The oxidation step is followed by a purification step which includes rectification.

Acid grade fluorspar which is present in mineral deposits is rich in calcium fluoride ($CaF_2$) and silicon dioxide ($SiO_2$), but it also contains high levels of arsenic (500 ppm or more of $As_2O_3$).

Arsenic is present in the fluorspar in the form of a solid and cannot economically be removed from the fluorspar.

In reaction with sulfuric acid, no less than approximately 90% of the arsenic present in fluorspar is converted into arsenic trifluoride ($AsF_3$) and still remains in the gaseous hydrofluoric acid. In the condensation step, all of the arsenic trifluoride contained in the raw hydrofluoric acid condenses together with the hydrofluoric acid. Owing to the fact that the boiling point of arsenic trifluoride is nearly the same as the boiling point of hydrofluoric acid, practically speaking, the hydrofluoric acid/arsenic trifluoride cannot be separated by distillation.

A large portion (50%) of the hydrofluoric acid which is produced is used for the production of fluorocarbons. Arsenic has similar properties to those of antimony, which is used as a catalyst in the processing of fluorocarbons, and consequently it reduces the life of the antimony, thus adding to the cost of catalyst renewal and moreover to the problems of contamination. The generally accepted levels of arsenic in hydrofluoric acid are between 10 and 50 ppm. With arsenic levels of 500 ppm in the fluorspar, levels of up to 900 ppm can be expected in the hydrofluoric acid.

Arsenic trifluoride ($AsF_3$) is a major part of the arsenic contained in hydrofluoric acid and cannot be separated therefrom by distillation.

Australian patent 266,930 discloses a process for removing arsenic from hydrofluoric acid. The process comprises treating the arsenic-containing hydrofluoric acid with an oxidizing agent, such as potassium permanganate, in the presence of alkali ions to form non-volatile pentavalent arsenic compounds. Example 4 on page 6 shows the use of potassium fluoride as the alkali ion source. This patent does not disclose the use of solid potassium bifluoride as the alkali metal source.

U.S. Pat. No. 3,166,379 teaches the purification of hydrofluoric acid involving the removal of impurities such as arsenic which comprises producing high boiling-point compounds by reacting hydrofluoric acid with an oxidizing agent such as potassium permanganate and an iodine, bromine or chlorine compound such as potassium iodide. At column 2, lines 71-72, this patent teaches away from using fluorine compounds.

SUMMARY OF THE INVENTION

It has now been found that impurities may be removed from hydrofluoric acid by converting the highly volatile arsenic compounds into a compound with a very high boiling point. The process comprises the following steps: input of distilled hydrofluoric acid, which contains arsenic, into a reactor and cooling down to a temperature below room temperature; oxidation while stirring of the arsenic contained in the hydrofluoric acid in the form of arsenic trifluoride with an oxidizing agent in the presence of a surplus of potassium ions coming from potassium bifluoride in order to obtain an arsenic complex which is both stable and of high boiling point; halting the cooling of the reaction mixture while continuing the stirring for a period of from 1-24 hours, permitting the mixture to remain quiescent to permit deposition; and finally distilling the hydrofluoric acid at a temperature below reflux conditions, whereupon the arsenic complex formed during the oxidation reaction is removed from the hydrofluoric acid.

DETAILED DESCRIPTION OF THE INVENTION

Figure 1:
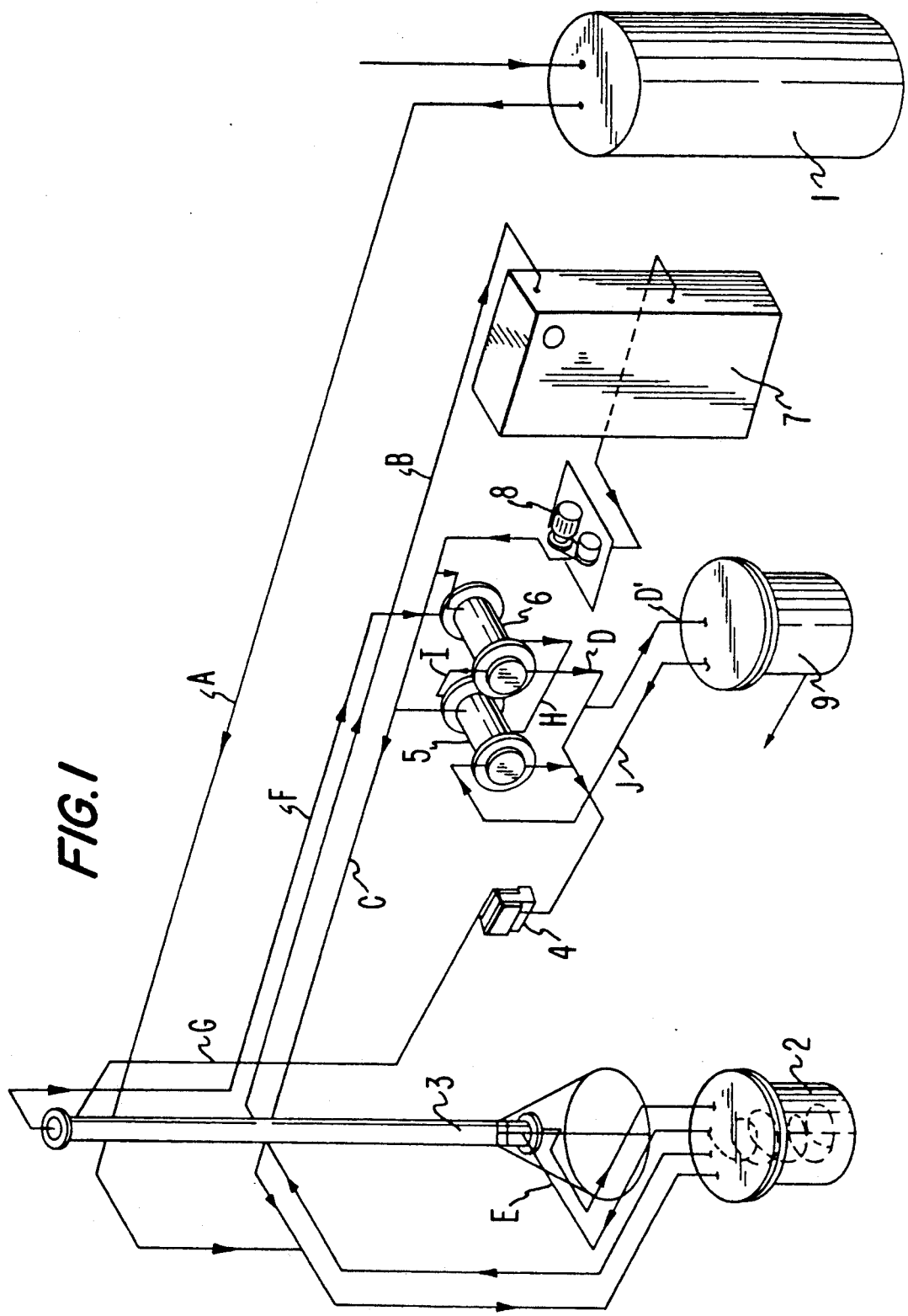

The method used in the process of this invention consists of the conversion of highly volatile arsenic compounds into a compound having a very high boiling point. This compound having a high boiling point is $K_2AsF_7$, which is a solid and which is partially soluble in anhydrous hydrofluoric acid and water and represents an ideal solution for the separation of arsenic from hydrofluoric acid. This complex is very stable and is obtained by oxidation of the arsenic trifluoride with an oxidizing agent (preferably potassium permanganate $KMnO_4$) in the presence of a surplus of potassium ions, and this is achieved with use of potassium bifluoride ($KHF_2$), which must be added, with stirring, before the potassium permanganate.

Many different equations can define the oxidation of arsenic.

This particular process is based on the following equations:

Equation (1)

$$KMnO_4 + 2\ AsF_3 + 5HF + 3KHF_2 \rightarrow 2\ K_2AsF_7 + MnF_3 + 4\ H_2O.$$

The stoichiometric quantity of $KMnO_4$ plus some surplus thereof must be added.

Equation (2) $SO_2$

The $SO_2$ is oxidized with $KMnO_4$ until it becomes $SO_4$.

$$3\ KHF_2 + 2\ SO_2 + KMnO_4 \rightarrow 3HF + MnF_3 + 2\ K_2SO_4.$$

The stoichiometric quantity of $KMnO_4$ plus some surpluses thereof must be added.

Nevertheless, some further surpluses of $KMnO_4$ must be added to compensate for the losses of $KMnO_4$ for the reaction with the HF as in the following reaction.

Equation (3)

$$4\ KMnO_4 + 16\ HF \rightarrow 4\ KHF_2 + 4\ MnF_2 + 6\ H_2O + 5\ O_2.$$

This reaction (3) is initiated very rapidly and vigorously, before all of the $KMnO_4$ can react with the $AsF_3$ dissolved in the HF.

The atomic oxygen does not have sufficient time to oxidize the $As^{+3}$ until it becomes $As^{+5}$, forming $O_2$ therefrom which is inactive and consequently diminishes the oxidation reaction.

Equation (3) does not show the actual mechanism of the reaction, which is not entirely known.

The composition of the nonvolatile complex ($K_2AsF_7$) is theoretically separable, and easily separable from the HF by simple evaporation. Nevertheless, in a practical sense this cannot be done with total security; thus the separation must be accomplished by means of distillation with a predetermined reflux ratio, which is absolutely necessary.

The minimum reflux ratio must be determined by experimental methods.

The surpluses of $KMnO_4$ and $KHF_2$ are critical factors from the economic point of view; thus the optimum surpluses must be determined experimentally.

3.2 Calculations and Formulas
Based on the equations (1) and (2)

3.2.1 $KMnO_4$ input 100% (gr)

$$eK = 0$$

$$KFS (gr) = \frac{(10.55 \, As + 12.34 \, SO) \, W}{eK}$$

$$KF (gr) = KFs + \frac{KFs \times eK}{100}$$

3.2.2 $KHF_2$ input 100% (gr)

$$eKB = 0$$

$$KBS = \frac{KF_2 \times 1.47}{eKB}$$

$$KBF = KBS + \frac{KBS \times eKB}{100}$$

3.2.3 $H_2O$ produced 3.2.3.1 From the reaction (1)
$$WR (g) = KF \times 0.4530$$

3.2.3.2 From the reaction (2)
$$WR = 0$$

As = Arsenic content in the input acid (%)
KFs = Stoichiometric requirement of $KMnO_4$ 100% (gr)
KF = $KMnO_4$ input (100%) (gr)
SO = $SO_2$ content in the acid input (%)
W = Weight of HF input (Kg)
eK = Surpluses of $KMnO_4$ (%) over stoichiometric
eKB = Surpluses of $KHF_2$ (%) over stoichiometric
KBs = Stoichiometric requirement of $KHF_2$ 100% (gr)
KBF = $KHF_2$ input (100%) (gr)
W R = Reaction water
Atomic masses (g/gmol) used:
As = 75
F = 19
H = 1
K = 39
Mn = 55
O = 16

TESTING PARAMETERS AND TESTING PLAN

The following series of tests have been analyzed and optimized.

$KMnO_4$ surpluses (eK): varied from 1 to 5% of stoichiometric, $KMnO_4$ concentration 100% (solid). $KHF_2$ surpluses (eKB): varied from 1 to 5% of stoichiometric, $KHF_2$ concentration: 100% (solid). Reflux ratio (RR): varied from RR=0 to RR=total. Reaction time (Rt): varied from 1 to 24 hours. Column height: tests were run in columns of 78 inches and 60 inches Feedstock: Distilled hydrofluoric acid from Fluorex S.A.

Test HI

Constants: $KHF_2$ concentrations $KMnO_4$ concentrations

RR = 3-5
Reaction time = 24 hours
Feedstock: Distilled HF
Column height: 78 inches
Variables: 50% KS; 75% KS; KS 50% KBS; 75% KBS; KBS
Objective: To observe whether any problems arise in the reaction

Test HII

Constants: $KMnO_4$ concentration $KHF_2$ concentration

RR = 3-5
Reaction time = 24 hours
Feedstock: Distilled acid
Column height: 78 inches
Variables: eK = 1, 3, 4, 5% of stoichiometric eKB = 1, 3, 4, 5% of stoichiometric
Objective: To determine the optimum eK and eKB quantities.

Test HIII

Constants: eK = optimum; eKB = optimum

Reaction time: 12 hours
Feedstock: Distilled HF
Column height: 78 inches
Variable: RR = 0, 2, 3, 5
Objective: To determine the optimum RR.

Test HIV

Constants: eK = optimum; eKB = optimum

RR = optimum
Feedstock: Distilled HF
Column height: 78 inches
Variable: Reaction time: Rt = 1 to 24 hours
Objective: To determine the shortest reaction time.

Test HV

Constants: eK = optimum; eKB = optimum

RR = optimum
Feedstock: Distilled HF
Rt = optimum
Variable: Column height: 60 inches Objective: Reproductivity of results with a very short column.

Test HVI

Constants: eK=optimum; eKB=optimum
RR=optimum
Feedstock: Distilled HF
Rt=optimum
Column height: optimum Objective: Reproductivity of results with the optimum test conditions.

EXPERIMENTAL PART

FIG. 1 shows a diagram of the pilot installation used to execute the tests.

The pilot installation consists of a boiler 1 which feeds the necessary proportional doses of hot water to the reactor 2 through the hot water tubing A; a rectification column 3; a reflux pump 4 to stabilize the reflux of the hydrofluoric acid which flows from the condensers 5 and 6; a refrigeration unit 7 which cools the brine which flows from the reactor through the tubing B and recirculates it to the reactor 2 by means of brine pump

TABLE 1

TEST RECORD

TESTS CARRIED OUT IN FLUOREX LABS — PARAMETERS

| Test No. | Sample No. | Ks 50% | Ks 75% | KBs 100% | eK(%) 1 | eK(%) 3 | eK(%) 4 | eK(%) 5 | eKB(%) 1 | eKB(%) 2 | eKB(%) 4 | eKB(%) 5 | RR 0 | RR 3-5 | RR 2 | RR 3 | RR 5 |
|---|---|---|---|---|---|---|---|---|---|---|---|---|---|---|---|---|---|
| HI | H1 | X | | | | | | | | | | | | X | | | |
| | H2 | | X | | | | | | | | | | | X | | | |
| | H3 | | | X | | | | | | | | | | X | | | |
| HII | H1 | | | | X | | | | X | | | | | X | | | |
| | H2 | | | | | X | | | | X | | | | X | | | |
| | H3 | | | | | | X | | | | X | | | X | | | |
| | H4 | | | | | | | X | | | | X | | X | | | |
| HIII | H1 | | | | OPTIMUM | | | | OPTIMUM | | | | X | | | | |
| | H2 | | | | " | | | | " | | | | | X | | | |
| | H3 | | | | " | | | | " | | | | | | X | | |
| | H4 | | | | " | | | | " | | | | | | | | X |
| HIV | H1 | | | | OPTIMUM | | | | OPTIMUM | | | | | OPTIMUM | | | |
| | H2 | | | | " | | | | " | | | | | " | | | |
| | H3 | | | | " | | | | " | | | | | " | | | |
| | H4 | | | | " | | | | " | | | | | " | | | |
| | H5 | | | | " | | | | " | | | | | " | | | |
| HV | H1 | | | | OPTIMUM | | | | OPTIMUM | | | | | OPTIMUM | | | |
| | H2 | | | | " | | | | " | | | | | " | | | |
| | H3 | | | | " | | | | " | | | | | " | | | |
| HVI | H1 | | | | OPTIMUM | | | | OPTIMUM | | | | | OPTIMUM | | | |
| | H2 | | | | " | | | | " | | | | | " | | | |
| | H3 | | | | " | | | | " | | | | | " | | | |

TESTS CARRIED OUT IN FLUOREX LABS — PARAMETERS

| Test No. | Sample No. | RT (Hours) 24 | RT 12 | RT 6 | RT 3 | RT 1 | Raw Material Distilled HF | Column Height 78 in. | Column Height 60 in. |
|---|---|---|---|---|---|---|---|---|---|
| HI | H1 | X | | | | | X | X | |
| | H2 | X | | | | | X | X | |
| | H3 | X | | | | | X | X | |
| HII | H1 | X | | | | | X | X | |
| | H2 | X | | | | | X | X | |
| | H3 | X | | | | | X | X | |
| | H4 | X | | | | | X | X | |
| HIII | H1 | | X | | | | X | X | |
| | H2 | | X | | | | X | X | |
| | H3 | | X | | | | X | X | |
| | H4 | | X | | | | X | X | |
| HIV | H1 | X | | | | | X | X | |
| | H2 | | X | | | | X | X | |
| | H3 | | | X | | | X | X | |
| | H4 | | | | X | | X | X | |
| | H5 | | | | | X | X | X | |
| HV | H1 | | OPTIMUM | | | | X | | X |
| | H2 | | " | | | | X | | X |
| | H3 | | " | | | | X | | X |
| HVI | H1 | | OPTIMUM | | | | X | OPTIMUM | |
| | H2 | | " | | | | X | " | |
| | H3 | | " | | | | X | " | |

Abbriviations used in the tables:
H = Series and numbers of tests
Ks = Stoichiometric quantities of KMnO$_4$
KBS = Stoichiometric quantities of KHF$_2$
eK = Surplus KMnO$_4$
eKB = Surplus KHF$_2$
RR = Reflux ratio
D = Distillate
Rt = Reaction time
Lc = Height of column
Kf = KMnO$_4$ input 8 through tubing C. The liquid hydrofluoric acid being discharged from condensers 5 and 6, and from which the undesirable arsenic has been removed, is conducted through the tubing D, D' to the product tank 9 where it is stored.

During the process, the gaseous acid from reactor 2, passing through tubing E, continues until it reaches the top of the rectification column 3, from whence it is fed to condenser 6 through tubing F, from whence a part of the hydrofluoric acid in liquid state from tubing D is conducted to product tank 9 through tubing D', and the other part is fed back again through tubing C to the top of rectification column 3, from whence it is returned to reactor 2 and the other part is fed through tubing H to condenser 5 in which it is mixed with a part of the brine being discharged from brine pump 8 and with the gaseous hydrofluoric acid which has not attained condensation in condenser 6 and which is discharged from the condenser through tubing I; and from this point, the mixture is fed through tubing G to the top of rectification column 3 by means of reflux pump 4 joined with the hydrofluoric acid component which is being discharged from condenser 6. The hydrofluoric acid which is gasified within product tank 9 is fed through tubing J to condenser 5, in which it is condensed and is incorporated into the mixture which is fed back into rectification column 3.

TEST EQUIPMENT

General

The pilot installation used for the arsenic removal tests is manufactured of carbon steel; this material has an acceptable resistance to anhydrous hydrofluoric acid.

The columns were manufactured of carbon steel and were of heights of 78 and 60 inches with a diameter of two inches and were packed with ¼ inch diameter polypropylene rings.

The condensers were manufactured of carbon steel, with ⅛ inch diameter fluxes, in which the condensation takes place indirectly; with $CaCl_2$ brine.

The reflux pump is manufactured of Kynar, a special material for carrying anhydrous hydrofluoric acid; and reflux was adjusted by control of the pump velocity; it was restricted up to 10% of its capacity.

Reactor 4 is a carbon steel tank of 11½ inches height by 9½ inches diameter; connected with an interior coil and a blade stirrer, also manufactured of a carbon steel with ¼ inch plate, this stirrer is driven at 30 rpm by a reduction engine.

EXPLANATION OF THE TESTS

| Impurities of the HF | Distilled HF |
|---|---|
| ppm As | 850-1000 |
| % $SO_2$ | 0.006 |
| % $H_2O$ | 0.030 |
| % $H_2SO_4$ | 0.003 |
| % $H_2SiF_6$ | 0.004 |

The HF samples used to carry out the tests were taken from the installation and analyzed on the same day as each test was run.

DETAILS OF THE TESTS

The reactor was charged with approximately 11.5 Kg of acid (distilled). The total analysis was carried out the same day as the removal of the feedstock; and it was cooled to 0° C. before addition of the reagents.

Then the reagents were added, first the $KHF_2$ (19.11 g) and then the $KMnO_4$ (13.0 g) with continued stirring of the mixture.

The cooling was halted and the stirring was maintained for the time of the test (1 to 24 hours). At the end of this time, the stirring was halted and deposition was allowed for 45 minutes, whereupon the distillation at an acid temperature of 25-27° C. was continued and the distillation was concluded after about 2½ to 3 hours. The reflux rate was 100% during the first 20 minutes of distillation, and thereafter the rate adjusted itself to the test reflux rate.

Samples of the distillate were used in three procedural steps, for analysis of both the As and the $H_2O$ and $H_2SO_4$, $H_2SiF_6$ and $SO_2$.

The reagents which were used were in solid state and 99% pure, and a funnel was used to add them.

At the end of each test, the reactor was washed with acid, not counting the purification in order to remove surpluses of $KMnO_4$ and $KHF_2$ which could interfere with the subsequent testing.

The $KMnO_4$ was sifted through number 20 mesh in order to obtain a uniform particle size.

An 0.006 ppm $SO_2$ content in the acid was present for all of the tests.

METHODS OF ANALYSIS

To carry out analyses of the distillates and to obtain a total test security, the arsenic is quantified both as $As^{+3}$ and as $K_2AsF_7$.

The ISO-2590 standard was used to quantify the $As^{+3}$ both as feedstock and also as distillates and a combination of the ISO-FLUOREX method was used to quantify the $K_2AsF_7$; which consists of breaking down the complex with sulfuric acid. Standard Fluorex methods were used for the analyses of $H_2O$, $H_2SO_4$, $H_2SiF_6$ and $SO_2$.

With the object of verifying the effectiveness of the process, a sample of acid treated in the pilot installation was sent to an American laboratory (Booth, Garret and Blair) for analysis of arsenic and manganese, obtaining the results which are shown in the following:

| TEST SAMPLE OF HYDROFLUORIC ACID IN SOLUTION DILUTION FACTOR 4.4602 | |
|---|---|
| Arsenic | 0.18 ppm |
| Manganese | 0.03 ppm |

RESULTS OF THE TESTS

The results of the tests are tabulated in Table 2.

TABLE 2

CONDITIONS AND RESULTS OF TEST

| SERIES AND TEST NO | TEST CONDITIONS | | | | | FEEDSTOCK | | DISTILLED TEMPERATURE °C. | L.C | PPM As IN DISTILLED | | | REACTION TIME HOURS |
|---|---|---|---|---|---|---|---|---|---|---|---|---|---|
| | % KS | % KBS | % eK | % eKB | RR | KG | PPM As | | | D1 | D2 | D3 | |
| HI | | | | | | | | | | | | | |
| H1 | 50 | 50 | | | 2.1 | 9.8 | 1084 | 25–27 | 78 | 305 | 435 | 746 | 24 |
| H3 | 100 | 100 | | | 6.0 | 9.72 | 804 | 25–27 | 78 | 42 | 84 | 24 | 24 |
| HII | | | | | | | | | | | | | |
| H1 | | | 1 | 1 | 4 | 9.2 | 1099 | 25–27 | 78 | 40 | 32 | 45 | 12 |
| H2 | | | 3 | 3 | 5 | 10.1 | 980 | 25–27 | 78 | 10 | 16 | 19 | 12 |
| H3 | | | 4 | 4 | 2 | 13.2 | 800 | 25–27 | 78 | 2.6 | 2.5 | 2.6 | 12 |
| H4 | | | 5 | 5 | 5 | 11.8 | 1015 | 25–27 | 78 | 6 | 1 | 3 | 12 |
| HIII | | | | | | | | | | | | | |
| H1 | | | 4 | 4 | 0 | 11.5 | 960 | 25–27 | 78 | 2 | 2.5 | 2 | 12 |
| H2 | | | 4 | 4 | 2 | 11.5 | 950 | 25–27 | 78 | 1 | 0.6 | 0.8 | 12 |
| HIV-V | | | | | | | | | | | | | |
| H1 | | | 4 | 4 | 2 | 11.5 | 930 | 25–27 | 60 | 1 | 1 | 1 | 12 |
| H2 | | | 4 | 4 | 2 | 11.25 | 1070 | 25–27 | 60 | 0.8 | 0.8 | 0.8 | 6 |
| H3 | | | 4 | 4 | 2 | 11.49 | 1080 | 25–27 | 60 | 1 | 1 | 1 | 3 |
| H4 | | | 4 | 4 | 2 | 11.42 | 1080 | 25–27 | 60 | 1 | 1 | 1 | 1 |
| HVI | | | | | | | | | | | | | |
| H1 | | | 4 | 4 | 2 | | | 25–27 | 60 | | 1 | | 1 |
| H2 | | | 4 | 4 | 2 | | | 25–27 | 60 | | 2 | | 1 |
| H3 | | | 4 | 4 | 2 | | | 25–27 | 60 | | 2 | | 1 |

Abbriviations used in the tables:
H = Series and numbers of tests
Ks = Stoichiometric quantities of $KMnO_4$
KBS = Stoichiometric quantities of $KHF_2$
eK = Surplus $KMnO_4$
eKB = Surplus $KHF_2$
RR = Reflux ratio
D = Distillate
Rt = Reaction time
Lc = Height of column
Kf = $KMnO_4$ input

EVALUATION OF THE TESTS

Arsenic Balance

A chemical balance of arsenic was not obtained, owing to the fact that a total cleansing of the interior of the reactor was not possible since it was never uncovered during execution of the tests; but it was washed with acid at the end of each test. To remove possible surpluses of $KMnO_4$ and $KHF_2$, tests were carried out immediately in the washing acid, demonstrating As levels higher than 6000 ppm, in the form of potassium fluoroarsenate.

Water Balance

The water within the system comes basically from two sources:

water from the hydrofluoric acid (less than 0.05%)
water from the reaction (theoretically) WR (g) = KF × 0.4530

Total water = WR (g) + W (HF max. 0.05%)

Water will have to be found in the residue, considering that water is found in the distillates in a volume of approximately 70% of the initial content of acid where it is not treated: this data is shown in Table 3.

TABLE 3

| TEST SERIES | INPUT (GR) | | | | $H_2O$ BALANCE (GR) | | | |
|---|---|---|---|---|---|---|---|---|
| | FEEDSTOCK KG (HF) | PPM As | KF | KBF | FROM REACTION | HF | TOTAL $H_2O$ | % $H_2O$ |
| HI | | | | | | | | |
| H1 | 9.8 | 1084 | 5.966 | 8.770 | 2.702 | 2.94 | 5.642 | 0.0575 |
| H3 | 9.72 | 804 | 8.964 | 13.177 | 4.0606 | 2.7216 | 6.7822 | 0.0697 |
| HII | | | | | | | | |
| H1 | 9.2 | 1099 | 11.4615 | 16.848 | 5.19 g | 1.656 | 6.846 | 0.0744 |
| H2 | 10.1 | 980 | 11.5258 | 16.943 | 5.221 | 0.209 | 5.43 | 0.0537 |
| H3 | 13.2 | 800 | 12.602 | 18.526 | 5.7087 | 3.696 | 9.4047 | 0.07124 |
| H4 | 11.8 | 1015 | 14.1848 | 20.8517 | 6.4257 | 2.478 | 8.903 | 0.0754 |
| HIII | | | | | | | | |
| H1 | 11.5 | 960 | 12.9986 | 19.10 | 5.8883 | 3.91 | 9.798 | 0.0852 |
| H2 | 11.5 | 950 | 12.8724 | 18.92 | 5.8311 | 3.45 | 9.2811 | 0.0807 |
| HIV | | | | | | | | |
| H1 | 11.5 | 930 | 12.620 | 18.55 | 5.7168 | — | — | — |
| H2 | 11.25 | 1070 | 14.073 | 20.68 | 6.375 | 3.375 | 9.75 | 0.08666 |
| H3 | 11.49 | 1080 | 14.500 | 21.31 | 6.5685 | 3.102 | 9.6708 | 0.0841 |
| H4 | 11.42 | 1080 | 14.4117 | 21.18 | 6.5285 | 3.6544 | 10.182 | 0.0891 |
| HVI | | | | | | | | |
| H1 | 11.5 | 980 | 13.25 | 19.47 | 6.002 | 2.87 | 8.872 | 0.077 |
| H2 | 11.4 | 960 | 12.88 | 18.942 | 5.834 | 3.99 | 9.824 | 0.086 |

TABLE 3-continued

| | | | | | | | | |
|---|---|---|---|---|---|---|---|---|
| H3 | 11.6 | 925 | 12.66 | 18.62 | 5.735 | 2.32 | 8.055 | 0.069 |

| | OUTPUT (GR) | | | | |
|---|---|---|---|---|---|
| TEST SERIES | DIS-TILLED | As (g) | H$_2$O IN DIS-TILLED | % WATER | % HF |
| HI | | | | | |
| H1 | 9720 | 4.81 | 0.874 | 0.0009 | 99.10 |
| H3 | 9600 | 0.48 | — | — | 98.76 |
| HII | | | | | |
| H1 | 9111 | 0.355 | 0.173 | 0.0019 | 99.03 |
| H2 | 9990 | 0.1498 | 0.999 | 0.01 | 98.9 |
| H3 | 13060 | 0.0335 | 1.541 | 0.0118 | 98.93 |
| H4 | 11682 | 0.0384 | 0.75933 | 0.0065 | 99.0 |
| HIII | | | | | |
| H1 | 11380 | 0.0246 | 1.138 | 0.01 | 98.95 |
| H2 | 11378 | 0.0091 | — | — | 98.93 |
| HIV | | | | | |
| H1 | 11390 | 0.0139 | — | — | 99.04 |
| H2 | 11140 | 0.0089 | 0.891 | 0.008 | 99.02 |
| H3 | 11370 | 0.01137 | 0.023 | 0.009 | 98.95 |
| H4 | 11300 | 0.0113 | 1.096 | 0.0097 | 98.9 |
| HVI | | | | | |
| H1 | 11290 | 0.011 | 1.129 | 0.01 | 98.17 |
| H2 | 11300 | 0.022 | 1.695 | 0.015 | 99.12 |
| H3 | 11500 | 0.023 | 0.92 | 0.008 | 99.13 |

HF Balance

The hydrofluoric acid yields are on the order of 99% (See Table 3).

INFLUENCE OF CERTAIN PARAMETERS OF THE ARSENIC CONTENT ON PURIFIED ACID

Influences of Surpluses of KMnO$_4$.

The KMnO$_4$ surplus is the most important parameter for the purification of the acid.

The KMnO$_4$ is partially decomposed by the HF, forming KHF$_2$ and MnF3, and for this reason a surplus of potassium ions must be added, either by means of a considerable surplus of KMnO$_4$ or by the addition of potassium fluoride.

KHF$_2$ is used in this series of tests, which aids in remarkably reducing the KMnO$_4$ surplus required.

Another reason that the use of a very large surplus of KMnO$_4$ is not recommended is because of the production of water (Formula 1); even when the reaction mechanism is theoretical and is not known in all of its details.

INFLUENCE OF THE REFLUX RATIO (RR)

According to the information obtained during execution of the tests, the reflux ratio was not determinant for the removal of the arsenic, if an adequate surplus of KMnO$_4$ and KHF$_2$ was not added.

This is due to the fact that the arsenic content in the distillates is dependent solely upon the surplus KMnO$_4$ and KHF$_2$ added.

The above disclosure establishes the feasibility of lowering the arsenic content from 950 or more ppm to levels below 50 ppm, by means of the use of potassium permanganate and potassium bifluoride in solid state; then a subsequent rectification; using distilled hydrofluoric acid as feedstock.

The following operating conditions are recommended as a base for the results which were obtained in the experiments.

Oxidizing agent: Solid potassium permanganate (100%)

Potassium ion agent: Solid potassium bifluoride (100%)

Surplus of potassium permanganate based on stoichiometric requirement: eK=4% based on Formulas (1) and (2)

Surplus of potassium bifluoride based on stoichiometric requirement: eKB=4% based on Formulas (1) and (2)

Reflux ratio (RR): 2

Reaction time: 1 hour

Feedstock: Distilled hydrofluoric acid

Owing to the high cost of the process, the use of raw hydrofluoric acid is not to be recommended: since large surpluses of KMnO$_4$ and KHF$_2$ are then required to accomplish a reduction in the SO$_2$ and arsenic content.

The use of KMnO$_4$ in solution is also not to be recommended for this purpose, owing to the fact that a large volume of water is then introduced into the system, consequently leading to a low HF yield because of the formation of aziotropic mixtures and the high cost of purification.

For addition of the reagents, the anhydrous potassium bifluoride is added first and the potassium permanganate thereafter, with constant stirring.

It is to be recommended that the hydrofluoric acid be cooled down before the addition of the reagents to avoid the release of vapors, which can be an indication of a violent reaction.

Preferably, from about 3.33 to about 3.4 mols of anhydrous potassium bifluoride and from about 1.12 to about 1.14 mols of potassium permanganate are used per mol of As$_2$O$_3$ contained in the hydrofluoric acid.

What is claimed is:

1. A process for purifying hydrofluoric acid which comprises the following steps: input of distilled hydrofluoric acid, which contains arsenic, into a reactor and cooling to a temperature below room temperature; oxidation while stirring of the arsenic contained in the hydrofluoric acid in the form of arsenic trifluoride using potassium permanganate as the oxidation agent in the presence of a stoichiometric surplus of potassium ions coming from potassium bifluoride, wherein first the potassium bifluoride and then the potassium permanganate are added to cause the oxidation reaction, in order to obtain the heptafluoride of arsenic and potassium; halting the cooling of the reaction mixture while continuing the stirring for a period of from 1 to 24 hours, permitting the mixture to remain quiescent to permit deposition; and finally distilling the hydrofluoric acid at a temperature below reflux conditions, whereupon the heptafluoride of arsenic and potassium formed during the oxidation reaction is removed from the hydrofluoric acid.

2. A process for the removal of arsenic in the manufacture of hydrofluoric acid by means of conversion of the arsenic into the heptafluoride of arsenic and potassium which comprises the following steps: input of distilled hydrofluoric acid, which contains arsenic, into a reactor and cooling down to a temperature about 0° C.; oxidation while stirring of the arsenic contained in the hydrofluoric acid in the form of arsenic trifluoride using potassium permanganate as the oxidation agent in the presence of a stoichiometric surplus of potassium ions coming from potassium bifluoride, wherein first the potassium bifluoride and then the potassium permanganate are added to cause the oxidation reaction, in order to obtain the heptafluoride of arsenic and potassium; halting the cooling of the reaction mixture while continuing the stirring for a period of from 1 to 24 hours; approximately 45 minutes rest for deposition; and distilling the hydrofluoric acid at a temperature of between 25° and 27° C. for about 2.5 to 3 hours, below reflux conditions, whereupon the heptafluoride of arsenic and potassium being formed during the oxidation reaction is removed from the hydrofluoric acid.

3. A process as defined in claim 1 wherein the distillation is carried out including a rectification.

4. A process as defined in claim 2 wherein the distillation is carried out including a rectification.

* * * * *